Figure 1:
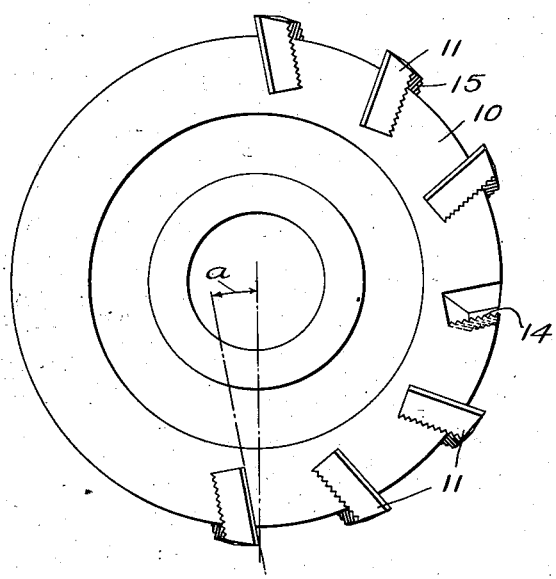

June 3, 1930.  R. R. WEDDELL  1,762,111
ANGULAR SERRATED ADJUSTABLE CUTTER
Filed Jan. 14, 1928  2 Sheets-Sheet 1

Inventor
Ralph R. Weddell
By Attorneys
Nathan + Bowman

June 3, 1930.  R. R. WEDDELL  1,762,111
ANGULAR SERRATED ADJUSTABLE CUTTER
Filed Jan. 14, 1928   2 Sheets-Sheet 2

Inventor
Ralph R. Weddell
By   Attorneys
Nathan & Bowman

Patented June 3, 1930

1,762,111

UNITED STATES PATENT OFFICE

RALPH R. WEDDELL, OF SHELTON, CONNECTICUT, ASSIGNOR TO THE O. K. TOOL COMPANY, INC., OF NEW YORK, N. Y., A CORPORATION OF NEW YORK

ANGULAR SERRATED ADJUSTABLE CUTTER

Application filed January 14, 1928. Serial No. 246,773.

The present invention is concerned with improvements in cutter tools and specifically to a construction and arrangement for adjustably securing cutter bits in the holder.

Cutter tools are required to withstand enormous pressures and further must be very rigid to result in a finished product free from chatter. The operating machines have been continually improved to give smoother and more rapid production but a largely controlling factor in this development has been the limitations imposed by the strength and rigidity of the cutter tool.

The discovery and utilization of special high speed or alloy steels for cutter points has added enormously to the capacity of the cutters, and therefore to the machines as a whole, but such practice has presented certain problems which must be considered. In the interests of compactness, simplicity and strength a solid one piece cutter is desirable whether they be shank tools such as are used in lathes or rotary type cutters. However, special steels are extremely hard to machine and further are expensive. Also, it is desirable that certain portions of the cutter possess different characteristics in accordance with the function to be performed, e. g., the body portion should be tough, strong and non-brittle while the cutter points should be extremely hard and unaffected by high temperatures. The idea of providing the cutter tool with removable cutter bits offered a practical method of meeting these conditions. Eventually the cutter teeth or bits were also made adjustable in order to obtain a desired size or to compensate for wear and regrinding.

Various auxiliary fastening devices such as keys, wedges and pins were at first employed to accomplish this function which, however, complicated and weakened the cutter tool to a material extent. Eventually these devices were improved upon by the utilization of wedge shaped openings having serrations on a wall thereof extending in the direction of the taper. Cutter bits were similarly shaped to fit therein and offering means for adjustment in a single cutting direction.

These various devices were, in many cases, found preferable to the prior constructions and accordingly adapted. A difficulty, however, with these improvements resulted from the fact that for a large percentage of cutter tools the cutting action takes place in two general directions, in a milling cutter e. g., both radially and axially. Auxiliary devices were again employed but with an accomplishing loss in rigidity due to inability to obtain full and accurate bearings and freedom from a tendency to work loose.

The present invention provides means of obtaining this double adjustment without resort to any auxiliary and additional fastening devices such as keys, pins and wedges each of which weakens the cutter, and renders it more expensive and inaccurate in operation.

The general features of the invention include a wedge shaped opening in the cutter body arranged at an angle with the two major axes of the cutter body i. e., at an angle with the two general directions of cutting action. Serrations are formed in the opening and the adjacent cutter bit surface extending in the direction of the taper. The arrangement is such that advancing the cutter bit one serration likewise advances it in a direction transverse thereto. The amount of the respective adjustments relative to each other is dependent upon the angle selected which in turn may be in accordance with the particular type of cutter to which the invention is applied.

As a further feature applicable in cutters having a plurality of teeth in conjunction with the double adjusting means, the life of the blades may be prolonged and grinding operations reduced by forming the serrations in successive openings a fraction of a serration in advance of the serrations in the preceding opening whereby blades may be successively moved through a series of blade openings and progressively advanced by any desired amount which would be less than a complete serration.

The construction employed results in a cutter having all the advantages of inserted cutter bit cutters including, in the present case, ease and speed of adjustment and at the same time of a strength and rigidity surpassed if at all only by a single piece solid cutter.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which :—

Figure 2:
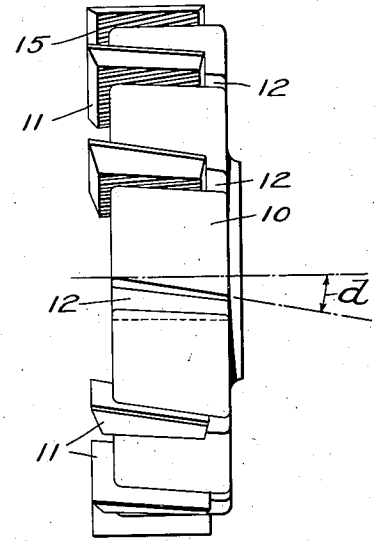
Figure 3:
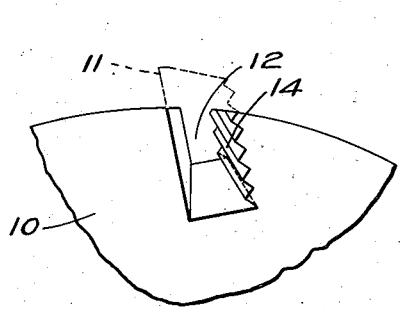
Figure 4:
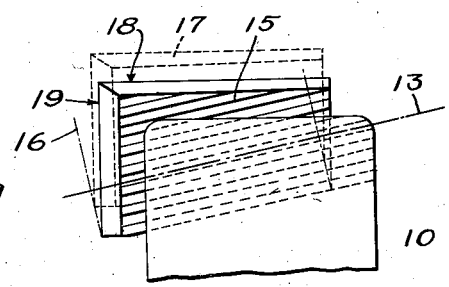
Figures 5, 6:
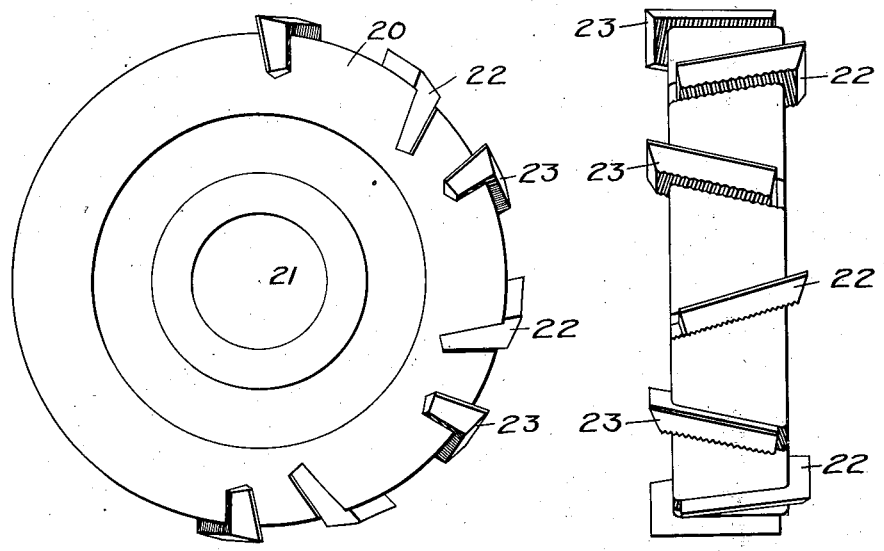
Figures 7, 8:
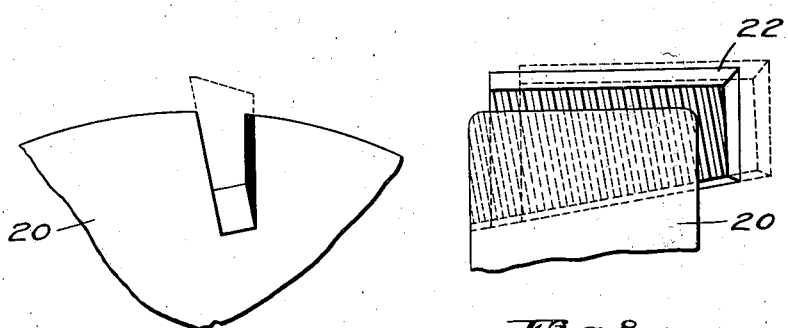

Figure 1 is an elevational view of a face milling cutter; Fig. 2 is a side view thereof; and Figs. 3 and 4 are enlarged detail views of the cutter bit securing means. Fig. 5 is an elevational view of another type of cutter commonly known as a side milling cutter; Fig. 6 is a side view thereof and Figs. 7 and 8 are detail views similar to Figs. 3 and 4.

The invention as exemplified in Figs. 1 to 4 includes a face milling cutter having the body portion 10 for supporting the cutter bits 11 in the openings 12. These openings are machined in the periphery at an angle with the major axis of the cutter. These openings are tapered with the side walls diverging to the left in Figs. 2 and 4. In order to give the teeth proper rake the front face thereof may, as shown, be inclined to a radial line to form an angle $a$ in Fig. 1 and to the longitudinal direction of the cutter represented by the angle $d$ in Fig. 2. The description of the opening as being tapered and extending in a direction at an angle with the major axis of the tool is intended, therefore, to mean the relation between the major axis or general direction of the taper and the general direction of extent of the cutter, which is usually one of the major directions of cutting action. In removing the blade 11 it would ordinarily move in the direction of the axis of the opening represented in general by the line 13 lying in a bisecting plane. This line forms an angle with the general direction of the longitudinal extent of the cutter which is the angle referred to.

Serrations 14 are formed on one side wall of the opening adapted to receive similar formations 15 on the adjacent surface of the blade. These serrations extend in the direction of the axis of the opening to permit wedging of the blade longitudinally thereof and are serially arranged transversely of the axis to provide for selective positioning of the blade. The particular means disclosed for locking against transverse movement radially or in the direction of the line 16 are of the V-shaped tongue and groove type which provide accurate and positive securing means. It is to be understood, however, that other formations may be resorted to so long as they provide a series of similar and complemental means for selective transverse positioning of the cutter bit.

The dotted line position 17 of the blade 11 illustrates a position of the blade which it would assume upon being repositioned a serration outwardly. By a single resetting both the radial cutting edge 18 and the forward cutting edge 19 are simultaneously advanced. The direction in which the tapered opening extends determines the distances that the cutting edges are advanced relative to each other, which in turn may be made to depend upon the particular type of tool and the normal wear to be expected on the cutting edges.

In Figs. 5 to 8 the invention is applied to a side milling cutter having the body member 20 adapted to be supported on a suitable arbor through the opening 21. In this particular cutter which may be used for slotting it is often desirable that a certain width be maintained, accordingly alternate teeth 22 are designed to be advanced to the right in Fig. 2 simultaneously with radial advancement while the intervening teeth 23 are adjustable to the left and radially. In the form of Figs. 5 to 8 the tapered opening and serrations extend at a different angle from that in the form of Figs. 1 to 4. Comparison of Figs. 4 and 8 illustrates the variation which may be obtained in the relative advancement dependent upon the direction that the tapered opening extends.

The present invention affords additional features with respect to adjustment whereby the blades may be advanced by less than the distance between corresponding points of adjacent serrations. In Fig. 1 e. g., the serrations in successive slots may be so machined that they are positioned a fraction of a serration in advance of the preceding slot. The blades are all alike. Thus as the blades are progressively moved around the cutter they are advanced by as little as desired which may be just sufficient to compensate for regrinding. Successive movement around the cutter may result in the total advancement of the distance of one or more serrations dependent upon the amount of offset. The adjustment axially of the cutter is in proportion in each case to the radial adjustment.

The construction and arrangement disclosed provides a simultaneous adjustment in both cutting directions and without resort to any additional and separate fastening devices which of necessity weaken and complicate the cutter. The blades in each adjusted position receive a full bearing throughout the entire extent of the inserted portion. The complemental formations and wedging action co-operate to form an interlocking means which imparts to the cutter a rigidity practically equal to that of a solid cutter.

The invention is illustrated in connection with two special types of cutters. It is apparent however that it may be utilized to equal advantage in other types either single or multibladed and rotary or stationary, e. g., the invention may be employed in a shank tool with the blade adjustable in the direction of its major axis and also transversely thereto.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims:—

Having thus revealed this invention, I claim as new and desire to secure the following combinations and elements, or equivalents thereof, by Letters Patent of United States:—

1. A cutter tool combining a body member having a tapered cutter bit opening therein with the direction of the taper extending at an angle to both the axis of said member and to a plane perpendicular to said axis and with the side walls diverging outward; a cutter bit having a portion shaped to receive a wedging fit in said opening said cutter bit having a pair of cutting edges arranged at an angle to each other; and means for securing said cutter bit in selectively adjusted positions whereby said cutting edges are simultaneously advanced in the direction of their respective cutting action comprising serrations on a surface of said portion and the adjacent wall of the opening extending in the direction of said taper and at an angle to both said directions of cutting action.

2. A cutter tool combining a body member having a cutter bit opening therein with the side walls thereof diverging to form a tapered opening; a cutter bit having a portion shaped in conformity with the opening to receive a close wedging support therein; said cutter bit having two cutting edges effective in directions transverse to each other; and means for securing said cutter bit in an adjusted position whereby each of said cutting edges are advanced in the respective direction of the normal wear thereon comprising a series of grooves on a side wall of said opening extending in the direction of said tapered opening and at an angle with both said directions of wear, and a rib on the adjacent cutter bit portion adapted to be selectively positioned in said grooves.

3. A cutter tool combining a body member having a tapered cutter bit opening; a cutter bit similarly shaped and mounted therein having cutting edges arranged at an angle to each other; and means permitting the adjustment of said cutter bit to simultaneously advance each of said cutting edges in the direction of their cutting action and adapted to secure said cutter bit in its adjusted position comprising a series of interfitting formations on a surface of the cutter bit and the adjacent wall of the opening, the axis of the taper of the opening and the direction of the formations extending at an angle to each of the cutting directions.

4. An inserted tooth rotary cutting tool combining a body member having a tapered cutter bit opening therein, the side walls of which diverge in a direction at an angle with both the major axis of the cutter and a plane perpendicular thereto; a cutter bit having a portion similarly shaped to receive a close wedging fit in said opening; and a plurality of means extending in the direction of the tapered opening permitting the wedging action and serially arranged transversely thereto, whereby the cutter bit may be simultaneously adjusted both radially of the cutter and transversely thereto and securely wedged in the adjusted position.

5. An inserted tooth rotary cutter tool combining a body member having a blade opening therein with the side walls thereof diverging in a direction at an angle with both the axis of rotation and a plane perpendicular thereto; a blade similarly shaped to receive a wedging fit therein; and means cooperating with said wedging means for securing said blade in selectively adjusted positions whereby said blade occupies an advanced position both axially and radially comprising serrations on a wall of the opening and the adjacent blade surface extending in the direction of the taper of the opening and serially arranged transversely thereto.

6. A rotary cutter tool combining a body member having a series of blade openings arranged around the axis thereof said openings being tapered with the major axis of said openings extending at an angle with both the cutter axis and a plane perpendicular thereto; cutter blades similarly tapered to receive a wedging fit in said openings each of said blades having radially and axially effective cutting edges; and a plurality of similar means for each of said blades co-operating with said wedging means extending in the direction of the axis of the taper and at an angle with the cutting directions of both cutting edges of the respective blade and said plurality of means being serially arranged transversely of said taper for selectively positioning said blades to advance the respective blade simultaneously in a radial and axial direction of the tool.

7. An inserted blade rotary cutter combining a cylindrical body member having a series of blade openings arranged around the axis thereof said openings being each tapered with the major axis thereof extending in a direction at an angle with both the axis of the cutter and a plane perpendicular thereto; a blade similarly tapered to receive a wedging support in said member; and serrations on a side wall of each opening and the adjacent blade surface extending in the direction of the taper of the opening, the serrations in successive openings being off-set by a fraction of the distance between serrations whereby each blade may be progressively advanced by an increment of a serration in moving it to succeeding openings.

8. A cutter tool combining a body member having a cutter bit opening therein, said opening having its side walls diverging outwardly with the axis or direction of the taper extending at an angle to both the major axis of said member and a plane perpendicular thereto; a cutter bit having a portion shaped in conformity with the opening to receive a wedging fit therein and having two cutting edges arranged at an angle to each other; and means for repositioning said cutter bit in said member and securing it in such position with the cutter bit advanced in the directions of the normal wear on both of said cutting edges comprising a series of grooves on a side of said cutter bit portion extending in said direction of said taper and at an angle with both of said directions of wear, and a rib on the adjacent side wall of said opening selectively engageable in said grooves.

9. A rotary cutting tool combined a cylindrical body member having a series of blade openings arranged around the axis thereof, said openings being tapered to form wedge-shaped openings; correspondingly wedge-shaped blades in said openings, each of said blades having two cutting edges arranged at an angle to each other; and serrations on a surface of each blade and the adjacent side wall of the blade opening extending in the direction of said taper and at an angle to the cutting direction of each of said cutting edges on the respective blade.

In witness whereof, I hereunto subscribe my name.

RALPH R. WEDDELL.